(12) United States Patent
Sung

(10) Patent No.: US 8,888,640 B2
(45) Date of Patent: *Nov. 18, 2014

(54) TORQUE SPLIT TYPE AUTOMATIC TRANSMISSION

(75) Inventor: Duk Hwan Sung, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 405 days.

This patent is subject to a terminal disclaimer.

(21) Appl. No.: 12/877,840

(22) Filed: Sep. 8, 2010

(65) Prior Publication Data

US 2011/0124458 A1    May 26, 2011

(30) Foreign Application Priority Data

Nov. 23, 2009    (KR) .................... 10-2009-0113501

(51) Int. Cl.
    *F16H 47/08*    (2006.01)

(52) U.S. Cl.
    CPC ........ *F16H 47/08* (2013.01); *F16H 2200/0043* (2013.01); *F16H 2200/201* (2013.01); *F16H 2200/2046* (2013.01)
    USPC ............................................ 475/47; 475/36

(58) Field of Classification Search
    USPC ............................... 475/47, 53, 59, 35, 36, 54
    See application file for complete search history.

(56) References Cited

U.S. PATENT DOCUMENTS

| | | | |
|---|---|---|---|
| 2,682,786 A * | 7/1954 | Flinn ................................ | 475/36 |
| 2,924,992 A | 2/1960 | Edsall | |
| 3,025,721 A | 3/1962 | De Lorean | |
| 3,065,652 A | 11/1962 | Kugel et al. | |
| 3,577,804 A | 5/1971 | Ohno et al. | |
| 3,749,209 A | 7/1973 | Weinrich et al. | |
| 4,014,223 A | 3/1977 | Pierce, Jr. | |
| 4,226,123 A | 10/1980 | Croswhite | |
| 4,398,436 A * | 8/1983 | Fisher .............................. | 475/47 |
| 5,314,387 A | 5/1994 | Hauser et al. | |
| 5,711,735 A | 1/1998 | Park | |
| 7,297,084 B2 | 11/2007 | Kimura et al. | |
| 2007/0251791 A1 | 11/2007 | Fujiwara et al. | |
| 2011/0124456 A1 * | 5/2011 | Sung ................................ | 475/35 |
| 2011/0124457 A1 | 5/2011 | Sung | |
| 2011/0124458 A1 * | 5/2011 | Sung ................................ | 475/71 |
| 2011/0124464 A1 | 5/2011 | Sung | |

FOREIGN PATENT DOCUMENTS

| | | |
|---|---|---|
| CN | 1294991 A | 5/2001 |
| CN | 1363780 A | 8/2002 |
| CN | 1180801 C | 12/2004 |
| CN | 201288805 Y | 8/2009 |
| DE | 1 032 109 | 6/1958 |

* cited by examiner

*Primary Examiner* — Troy Chambers
*Assistant Examiner* — Ryan Dodd
(74) *Attorney, Agent, or Firm* — Morgan, Lewis & Bockius LLP

(57) ABSTRACT

A torque split type automatic transmission which transmits the torque output from an engine through two paths, adds the torque passing through and increased in each path, and outputs a final torque is provided, wherein the torque of the engine is divided into two portions by a torque split device and each portion of the torque is transmitted respectively to first and second power delivery paths, wherein the first power delivery path is directly connected to a driving wheel, and wherein the second power delivery path is provided with a launching device and a transmission device disposed in series so as to increase the torque, and output of the second power delivery path is added to the torque of the first power delivery path to output the final torque.

11 Claims, 6 Drawing Sheets

FIG. 4

|     | C1 | C2 | C3 | B1 | B2 | F |
|-----|----|----|----|----|----|---|
| D1  | ●  |    |    | ○  |    | ○ |
| D2  | ●  |    |    |    | ●  |   |
| D3  | ●  | ●  |    |    |    |   |
| D4  |    | ●  |    |    | ●  |   |
| REV |    |    | ●  | ●  |    |   |

(A)

(B)

TORQUE SPLIT TYPE AUTOMATIC TRANSMISSION

CROSS-REFERENCE TO RELATED APPLICATION

The present application claims priority to Korean Patent Application No. 10-2009-0113501 filed in the Korean Intellectual Property Office on Nov. 23, 2009, the entire contents of which is incorporated herein for all purposes by this reference.

BACKGROUND OF THE INVENTION

1. Field of the Invention

The present invention relates to a torque split type automatic transmission which is applied to vehicles. More particularly, the present invention relates to a torque split type automatic transmission which increases torque by transmitting the torque output from an engine through two paths and adding the torque passing through each path.

2. Description of Related Art

Recently, engine output increases by 20-30% compared with a conventional engine with the same exhaust amount and size due to development of engine technologies.

Since a conventional transmission includes only one power delivery path, all the torque of the engine is directly transmitted to a launching device such as a torque converter or a clutch. Therefore, if the engine output increases, design of the transmission must be changed so as to increase torque delivery capacity.

In order to increase the torque delivery capacity, strength of an axle must be strengthened and the number of friction members must be increased due to characteristics of a power delivery device. However, if the strength of the axle is strengthened, weight of the axle should be increased. In addition, if the number of the friction members is increased, size of the transmission should be increased. Therefore, fuel consumption and power performance of a vehicle may be deteriorated due to increase in the weight of the axle and installability of the transmission may be deteriorated due to increase in the size of the transmission.

Since it is needed to change a design of the launching device such as the torque converter in order to increase torque capacity thereof, much development cost and time is needed.

Recently, a torque split type transmission which transmits the torque through at least two power delivery paths is developing. The torque split type transmission has a merit that the torque capacity can increase with a few changes in the design.

Some examples of the torque split type transmission are described in U.S. Pat. Nos. 4,014,223, 4,117,745, and 4,226,123 having a power delivery path shown in FIG. 6A and in U.S. Pat. No. 5,201,692 having a power delivery path shown in FIG. 6B.

The torque split type transmission shown in FIG. 6A includes a first path in which the engine torque is indirectly delivered to a transmission device 112 through a planetary gear set which is a torque split device 110 and a torque converter which is a launching device 111 and a second path in which the engine torque is directly delivered from the planetary gear set 110 to the transmission device 112. The torque increased in the torque converter which is the launching device 111 is added to the torque transmitted from the torque split device 110 to the transmission device 112, and final torque is output to a driving wheel through the transmission device 112.

According to the torque split type transmission shown in FIG. 6B, the engine is increased in the torque converter which is the launching device 120. After that, the torque is dividedly delivered to the driving wheel through the planetary gear set of the torque split device 121 and to a continuously variable transmission of the transmission device 122. The torque output from the transmission device 122 is added to the torque delivered from the torque split device 121 to the driving wheel.

According to the torque split type transmission shown in FIG. 6A, all the increased torque is delivered to the transmission device and it may cause problems in the torque delivery capacity of the transmission device.

According to the torque split type transmission shown in FIG. 6B, the continuously variable transmission is used as the transmission device. If large torque is delivered to the continuously variable transmission, torque split efficiency may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a torque split type automatic transmission having advantages of reducing torque delivered to a launching device and a transmission device by delivering the torque from an engine through two paths. Therefore, torque delivery capacity and size of the torque split type automatic transmission may not be increased according to the present invention.

In an aspect of the present invention, the torque split type automatic transmission which transmits the torque output from an engine through two paths, adds the torque passing through and increased in each path, and outputs a final torque, is provided, wherein the torque of the engine is divided into two portions by a torque split device and each portion of the torque is transmitted respectively to first and second power delivery paths, wherein the first power delivery path is directly connected to a driving wheel, and wherein the second power delivery path is provided with a launching device and a transmission device disposed in series so as to increase the torque, and output of the second power delivery path is added to the torque of the first power delivery path to output the final torque.

The torque split device may include a single pinion planetary gear set such that one rotational element of three rotational elements is operated as an input element receiving the torque of the engine, and the other two rotational elements are operated as output elements by being connected respectively to the first and second power delivery paths.

The torque transmitted through the first power delivery path may be larger than the torque transmitted through the second power delivery path.

The launching device disposed in the second power delivery path may be a torque converter.

The transmission device disposed in the second power delivery path may be a multiple-shift transmission device comprising a plurality of planetary gear sets, clutches, and brakes.

In another aspect of the present invention, the torque split type automatic transmission which transmits the torque output from an engine through two paths, adds the torque passing through and increased in each path, and outputs a final torque, may include a torque split device comprising a planetary gear set which receives the torque of the engine, divides the torque into two portions, and transmits the two portions of the torque respectively to first and second power delivery paths, a first power delivery shaft engaged to the torque split device to form the first power delivery path and provided with a first output gear, a launching device being a torque converter, engaged to the torque split device, disposed in the second power delivery path, and converting the torque transmitted to the second power delivery path to output a first torque, a transmission device disposed at a downstream of the launching device in the second power delivery path to receive the first torque, performing multiple-shift, and provided with a second output gear to output a second torque, and a transfer shaft engaged respectively with the first and second output gears, adding the torque transmitted through the first power delivery path and the second torque of the transmission device, and finally outputting the final torque.

The torque split device may include a single pinion planetary gear set and is disposed in the torque converter which is the launching device.

The torque split device may include a sun gear, a planet carrier, and a ring gear as rotational elements thereof, wherein the planet carrier is directly connected to an output shaft of the engine so as to be operated as an input element, the ring gear is connected to the first power delivery shaft forming the first power delivery path, and the sun gear is connected to an impeller of the torque converter through a connecting member and is connected to a turbine through a lock-up clutch so as to form the second power delivery path.

The connecting member may be selectively connected to a front cover of the torque converter directly connected to the output shaft of the engine by interposing a direct-coupling clutch.

The transmission device may include first and second planetary gear sets being single pinion planetary gear sets, wherein the first planetary gear set comprises a first sun gear, a first planet carrier, and a first ring gear as rotational elements thereof, and the second planetary gear set comprises a second sun gear, a second planet carrier, and a second ring gear as rotational elements thereof.

The first planet carrier may be directly connected to the second ring gear and the first ring gear is directly connected to the second planet carrier such that the first sun gear is a first rotational element, the first planet carrier and the second ring gear are a second rotational element, the first ring gear and the second planet carrier are a third rotational element, and the second sun gear is a fourth rotational element, wherein the first rotational element is selectively connected to the second power delivery shaft connected to a turbine by interposing a first clutch, wherein the third rotational element is selectively connected to the second power delivery shaft by interposing a second clutch and is selectively connected to a transmission housing by interposing a first brake disposed in parallel with an one-way clutch, wherein the fourth rotational element is selectively connected to the second power delivery shaft by interposing a third clutch and is selectively connected to the transmission housing by interposing a second brake, and wherein the second rotational element is connected to the second output gear and is operated as an output element to output the second torque.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is an operational chart for a transmission device according to an exemplary embodiment of the present invention.

Figure 1:
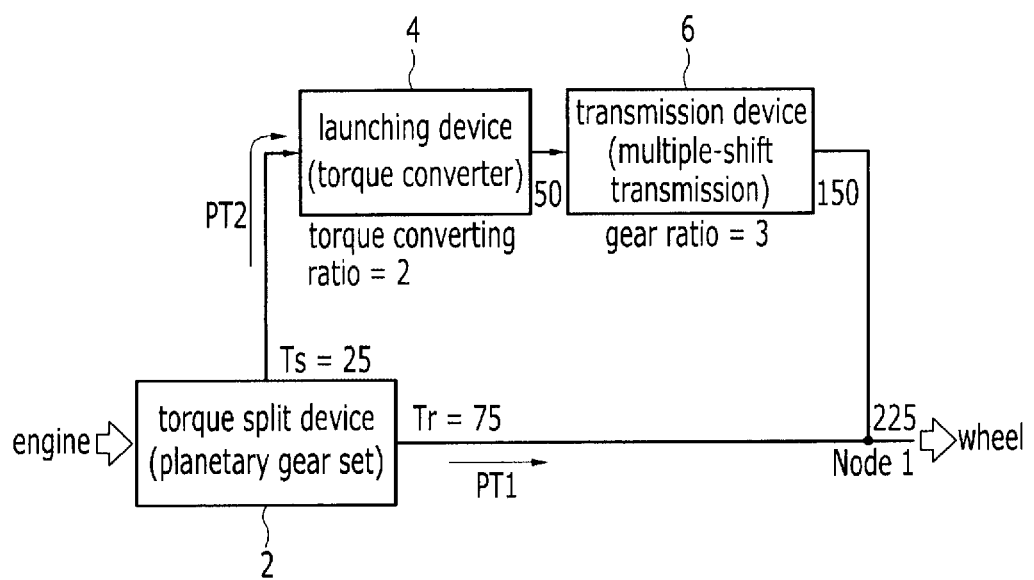
FIG. 1 is a block diagram for explaining concept of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

FIG. 1 is a block diagram for explaining concept of the present invention.

As shown in FIG. 1, torque of the engine is divided into two portions at a torque split device 2, and each portion of the torque is delivered respectively through first and second power delivery paths PT1 and PT2 according to an exemplary embodiment of the present invention. The first power delivery path PT1 is directly connected to a driving wheel, and a launching device 4 and a transmission device 6 which are devices for increasing the torque are disposed in series in the second power delivery path PT2. Output side of the second power delivery path PT2 meets the first power delivery path PT1.

The torque split device 2 includes a single pinion planetary gear set. One rotational element of three rotational elements is operated as an input element receiving the torque of the engine, and another two rotational elements are connected respectively to the first and second power delivery path PT1 and PT2. A double pinion planetary gear set may be used as the torque split device 2.

In addition, a torque converter is mainly used as the launching device 4. The launching device 4 increases the torque input through the second power delivery path PT2 and delivers the increased torque to the transmission device 6. A multiple-shift transmission applied to a conventional automatic transmission is used as the transmission device 6. The transmission device 6 increases the torque through shifting and outputs the torque. It is exemplarily described in this specification that a multiple-shift transmission realizing four forward speeds and one reverse speed is used as the transmission device 6, but it is well known to a person of an ordinary skill in the art that other multiple-shift transmissions with different structure from the exemplary embodiment of the present invention may be used.

The torque delivered from the torque split device 2 to the second power delivery path PT2 is increased when passing through the launching device 4 and the transmission device 6, and is added to the torque of the first power delivery path PT1. After that, the torque is output through a driving wheel.

More concretely, in a state that a planet carrier PC of the planetary gear set being the torque split device 2 is operated as an input element, a sun gear S is connected to the second power delivery path PT2 and a ring gear R is connected to the first power delivery path PT1. The rotational elements of the planetary gear set connected respectively to the input element and the first and second power delivery paths PT1 and PT2 may be changed. However, so as to deliver the small torque to the second power delivery path PT2, it is preferable for the planetary gear set to have the same connection relationship as the exemplary embodiment of the present invention due to operating characteristics of the planetary gear set.

Figure 2:
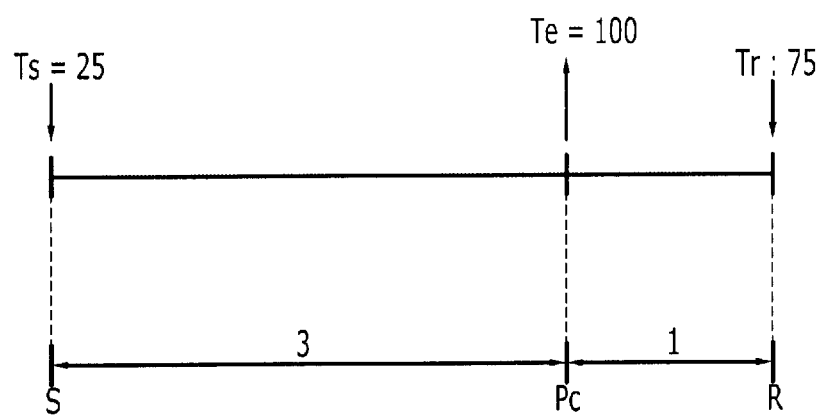
FIG. 2 is a schematic diagram for explaining operation of a torque split device applicable to the present invention.

If we assume that a planetary gear ratio of the planetary gear set is 3 (that is, 3:1) and engine torque Te output from the engine is 100 as shown in FIG. 2, the engine torque Te is divided into a ratio of 1:3 and each torque is delivered respectively to the sun gear S and the ring gear R. Therefore, torque Ts of the sun gear is 25 and torque Tr of the ring gear is 75.

If we assume that torque converting ratio of the launching device 4 is 2 and gear ratio of the transmission device is 3, the torque Te (=25) of the sun gear input to the launching device 4 through the second power delivery path PT2 is doubled to 50 by the torque converting ratio and the torque (=50) is input to the transmission device 6. After that, the torque (=50) is tripled to 150 by the gear ratio. After that, the torque (=150) of the second power delivery path PT2 output from the transmission device 6 is added to the torque (=75) of the first power delivery path PT1 at a node (Node 1), and the final torque (=225) is delivered to the driving wheel.

In this case, since the torque applied to the launching device 4 and the transmission device 6 disposed on the second power delivery path PT2 is small, design capacity (diameter of a shaft, thickness of a case, size and the number of clutch) of the components used in the launching device 4 and the transmission device 6 may be smaller than that of the components used in a conventional transmission device 6. Accordingly, size of the transmission can be reduced.

The concept of the present invention is exemplarily described assuming the planetary gear ratio is 3, the torque converting ratio of the torque converter is 2, and the gear ratio is 3. If three ratios change, division ratio and increase ratio of the torque also change. Therefore, three ratios may be set considering a maximum speed of a vehicle.

Figure 3:
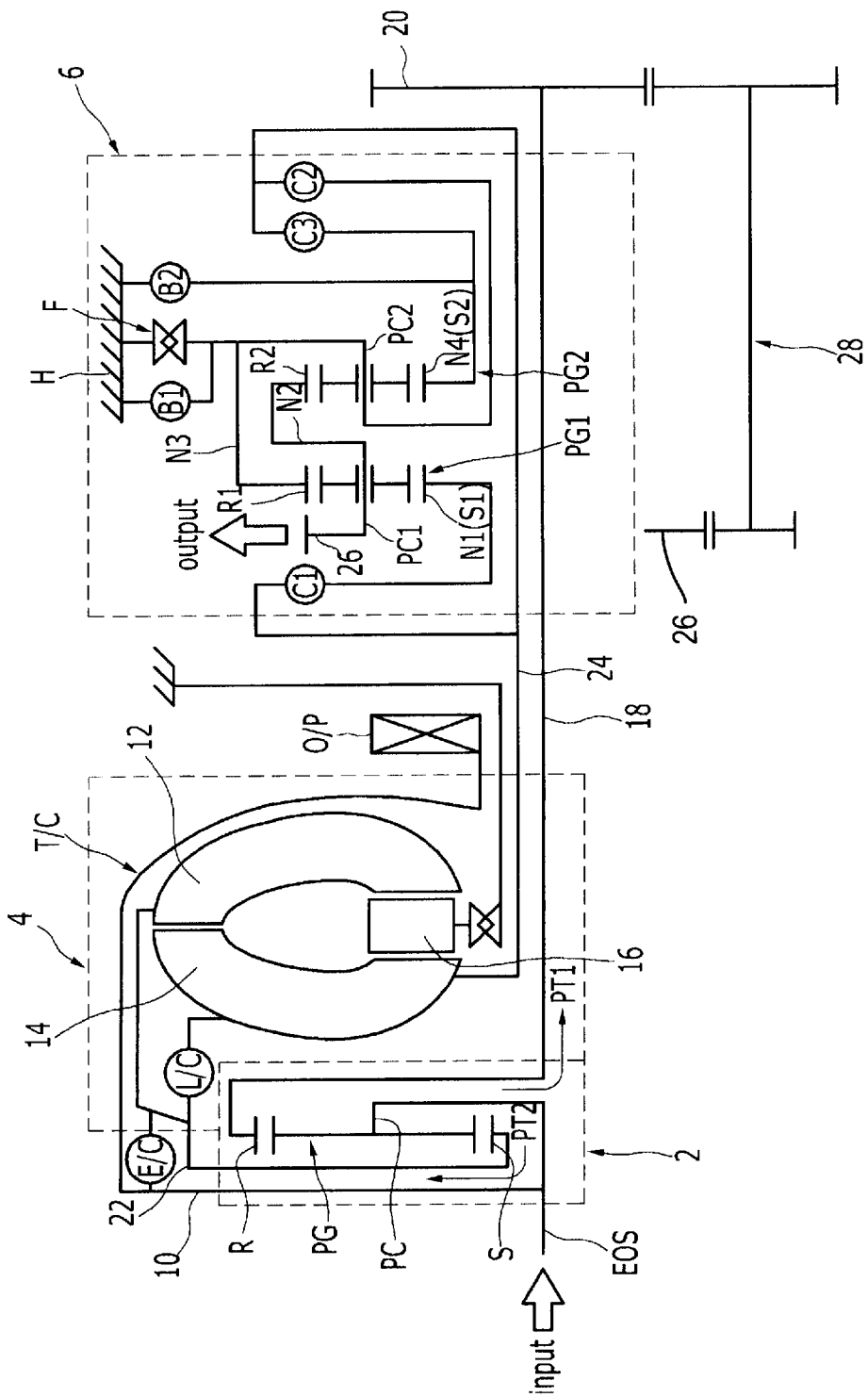
FIG. 3 is a schematic diagram of a torque split type automatic transmission according to an exemplary embodiment of the present invention.

FIG. 3 is a schematic diagram of a torque split type automatic transmission according to an exemplary embodiment of the present invention.

According to a torque split type automatic transmission shown in FIG. 3, the planetary gear set PG of the torque split device 2 is formed integral with the torque converter T/C of the launching device 4.

The planetary gear set PG is mounted in the torque converter T/C in the drawings, but planetary gear set PG may be mounted at the exterior of the torque converter T/C.

The planetary gear set PG of the torque split device 2 is a single pinion planetary gear set, and includes three rotational elements, that is, the sun gear S, the planet carrier PC, and the ring gear R.

In addition, the torque converter T/C of the launching device 4 includes a front cover 10 connected to a crankshaft of the engine and rotates, an impeller 12 connected to one rotational element of the planetary gear set PG, a turbine 14 facing the impeller 12, and a stator 16 disposed between the impeller 12 and the turbine 14 and delivering automatic transmission oil flowing out from the turbine 14 to the impeller 12 after changing flowing direction of the automatic transmission oil.

In order to couple the planetary gear set PG to the torque converter T/C, the planetary gear set PG is disposed between the front cover 10 and the turbine 12, the planet carrier PC as well as the front cover 10 is connected to an output shaft EOS of the engine, the sun gear S is directly connected to the impeller 12 and is selectively connected to the turbine 14 by interposing a lock-up clutch L/C therebetween, and the ring gear R is connected to a first output gear 20 through a first power delivery shaft 18 extended rearward (opposite side of the engine).

In addition, the front cover 10 is connected to a connecting member 22 connecting the sun gear S with the impeller 12 by interposing a direct-coupling clutch E/C therebetween, and a rear end of the front cover 10 is directly connected to a hydraulic pump O/P.

The lock-up clutch L/C selectively couples the impeller 12 with the turbine 14, and the direct-coupling clutch E/C makes the planetary gear set PG becomes a locked state so as to directly couple the output shaft EOS of the engine with the power delivery shaft 18.

If the engine torque is input through the front cover 10 and the planet carrier PC, ¼ of the engine torque is input to the torque converter T/C through the sun gear S and ¾ of the engine torque is delivered to the first power delivery shaft 18 when assuming the planetary gear ratio is 3.

In addition, the torque input to the torque converter T/C is increased and is transmitted to the transmission device 6. Any type of transmissions which enables of shifting may be used as the transmission device 6. In this specification, a transmission realizing four forward speeds and one reverse speed is exemplified, but the transmission device 6 is not limited to this.

The transmission device 6 includes first and second planetary gear sets PG1 and PG2 being single pinion planetary gear sets. A first planet carrier PC1 is directly connected to a second ring gear R2 and a first ring gear R1 is directly connected to a second planet carrier PC2 such that the transmission device 6 has four rotational elements N1, N2, N3, and N4.

Accordingly, a first sun gear S1 is set as a first rotational element N1, the first planet carrier PC1 and the second ring gear R2 are set as a second rotational element N2, the first ring gear R1 and the second planet carrier PC2 are set as a third rotational element N3, and a second sun gear S2 is set as a fourth rotational element N4.

In addition, the first sun gear S1 of the first rotational element N1 is selectively connected to the turbine 14 through a second power delivery shaft 24 such that the torque of the turbine 14 is selectively transmitted to the first sun gear S1. A first clutch C1 is interposed between the second power delivery shaft 24 and the first sun gear S1.

The second planet carrier PC2 forming the third rotational element N3 is selectively connected to the second power delivery shaft 24 through a second clutch C2 and is selectively connected to a transmission housing H through a first brake B1 disposed in parallel with a one-way clutch F.

In addition, the second sun gear S2 forming the fourth rotational element N4 is selectively connected to the second power delivery shaft 24 through a third clutch C3 and is selectively connected to the transmission housing H through a second brake B2, and the first planet carrier PC1 forming the second rotational element N2 is directly connected to a second output gear 26 and is always operated as an output element.

Figure 4:
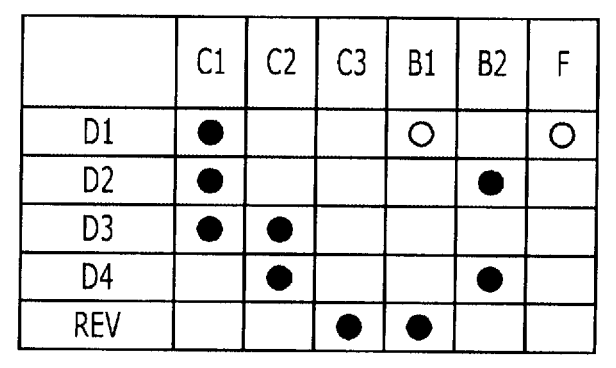

As shown in FIG. 4, the clutches C1, C2, and C3 and the brakes B1 and B2 are selectively operated at each shift-speed.

The first clutch C1 and the first brake B1 are operated at a first forward speed D1, the first clutch C1 and the second brake B2 are operated at a second forward speed D2, the first and second clutches C1 and C2 are operated at a third forward speed D3, the second clutch C2 and the second brake B2 are operated at a fourth forward speed D4, and the third clutch C3 and the first brake B1 are operated at a reverse speed REV.

In this specification, it is described that the first clutch C1 and the first brake B1 are operated at the first forward speed D1. However, in a case that first brake B1 is disposed in parallel with the one-way clutch FIG. 2, the first brake B1 is not operated but the one-way clutch F is operated at the first speed in D range so as to improve shift feel when shifting to the second speed.

Figure 5:
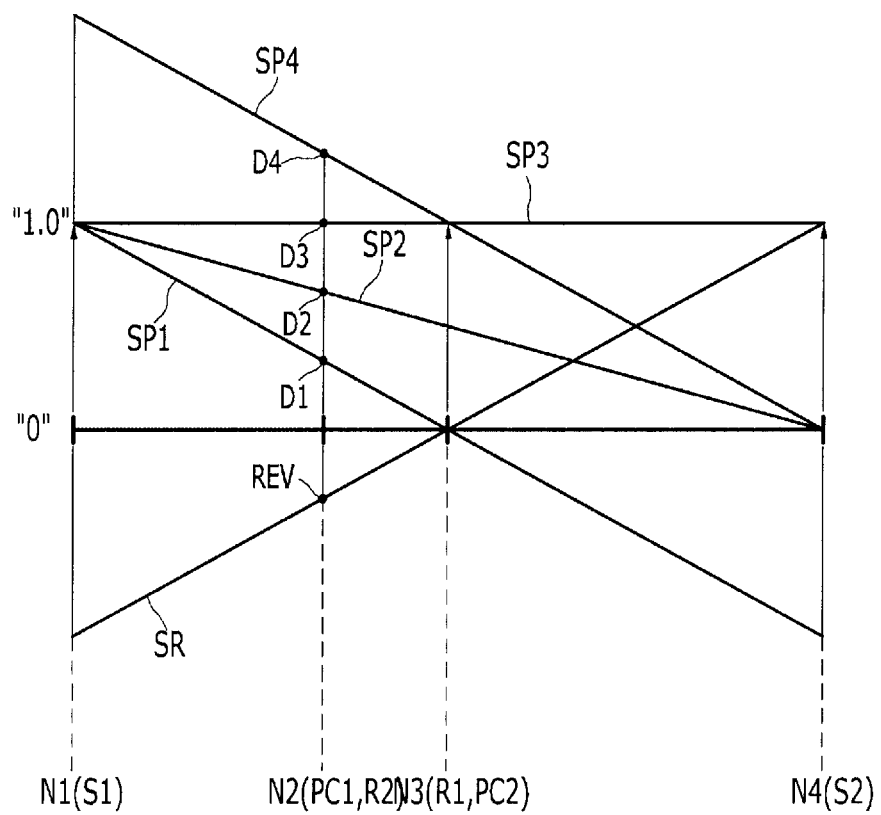
FIG. 5 is a lever diagram for a transmission device according to an exemplary embodiment of the present invention.
Figure 6:
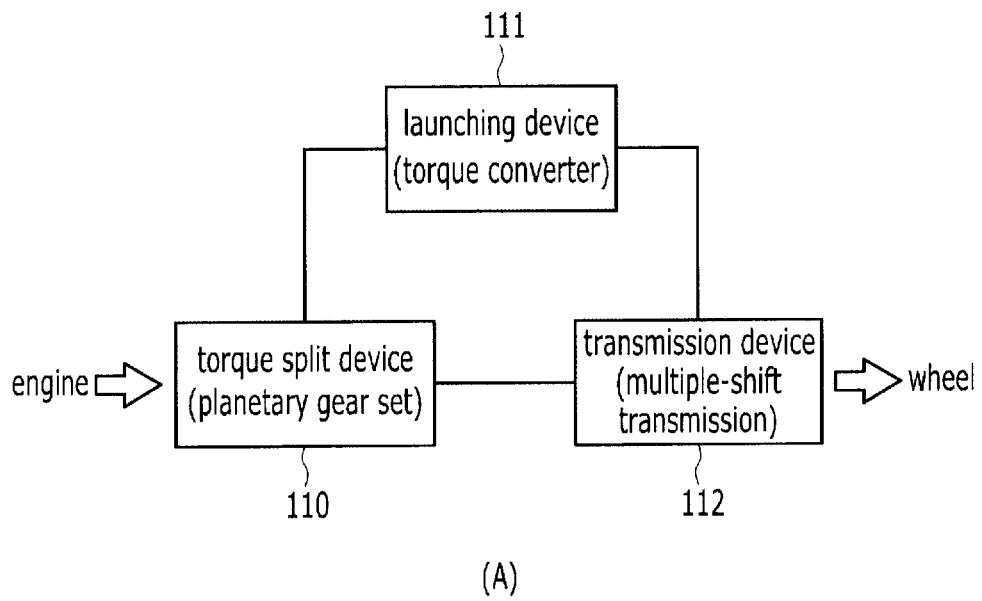
FIGS. 6A and 6B are block diagrams showing power delivery path of the conventional art.
Figure 6:
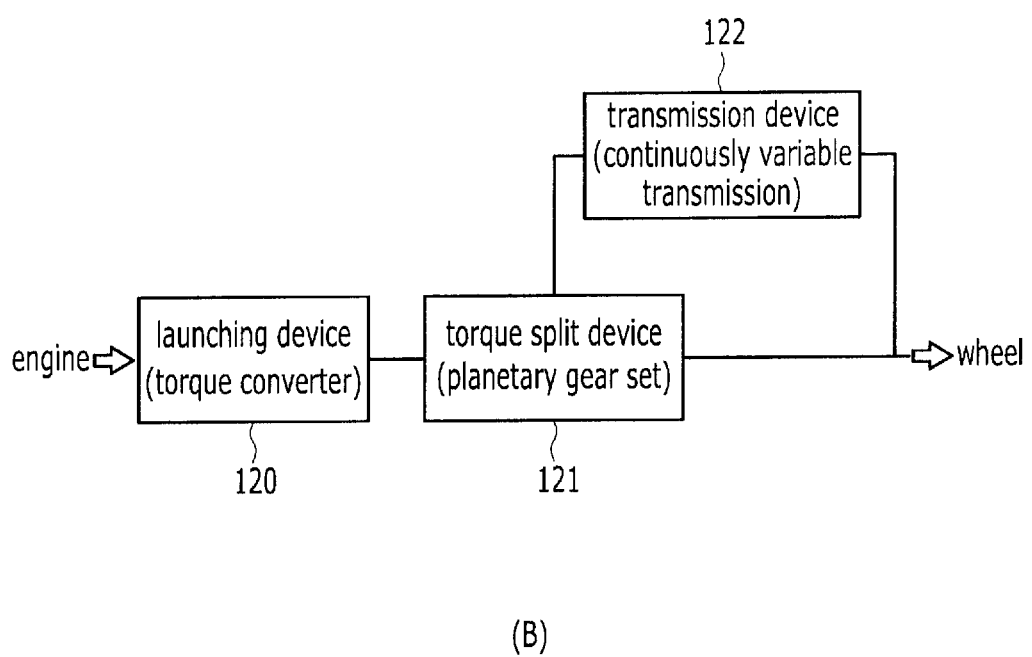

FIG. 5 is a lever diagram for a transmission device according to an exemplary embodiment of the present invention.

In FIG. 5, a lower horizontal line represents a rotational speed is "0", and an upper horizontal line represents a rotation speed is "1.0", that is, the rotational speed thereof is the same as that of the second power delivery shaft 24.

Four vertical lines in FIG. 5 represent the first sun gear S1 of the first rotational element N1, the first planet carrier PC1 and the second ring gear R2 of the second rotational element N2, the first ring gear R1 and the second planet carrier PC2 of the third rotational element N3, and the second sun gear S2 of the fourth rotational element N4 sequentially from the left, and distances therebetween are set according to gear ratios of the first and second planetary gear set PG1 and PG2 (teeth number of the sun gear/teeth number of the ring gear).

Position of each rotation element in the lever diagram is well known to a person of an ordinary skill in the art who designs a gear train, and thus detailed description will be omitted.

[First Forward Speed]

As shown in FIG. 4, the first clutch C1 and the first brake B1 are operated at the first forward speed D1.

In a state that the torque of the second power delivery shaft 24 is input to the first rotational element N1 by an operation of the first clutch C1, the third rotational element N3 is operated as a fixed element by an operation of the first brake B1 such that a first shift line SP1 is formed. Therefore, the first forward speed D1 is output through the second rotational element N2 which is the output element.

[Second Forward Speed]

The first brake B1 which is operated at the first forward speed D1 is released, and the second brake B2 is operated at the second forward speed D2.

In a state that the torque of the second power delivery shaft 24 is input to the first rotational element N1 by the operation of the first clutch the fixed element is changed from the third rotational element N3 to the fourth rotational element N4 by an operation of the second brake B2 such that a second shift line SP2 is formed. Therefore, the second forward speed D2 is output through the second rotational element N2 which is the output element.

[Third Forward Speed]

As shown in FIG. 4, the second brake B2 which is operated at the second forward speed D2 is released, and the second clutch C2 is operated at the third forward speed D3.

In a state that the torque of the second power delivery shaft 24 is input to the first rotational element N1 by the operation of the first clutch C1, the torque of the second power delivery shaft 24 is also input to the third rotational element N3 by an operation of the second clutch C2 such that the first and second planetary gear sets PG1 and PG2 become direct-coupling states and a third shift line SP3 is formed. Therefore, the third forward speed D3, the rotational speed of which is the same as that of the second power delivery shaft 24, is output through the second rotational element N2 which is the output element.

[Fourth Forward Speed]

As shown in FIG. 4, the first clutch C1 which is operated at the third forward speed D3 is released, and the second brake B2 is operated at the fourth forward speed D4.

In a state that the torque of the second power delivery shaft 24 is input to the third rotational element N3 by the operation of the second clutch C2, the fourth rotational element N4 is operated as the fixed element by the operation of the second brake B2 such that a fourth shift line SP4 is formed. Therefore, the fourth forward speed D4 is output through the second rotational element N2 which is the output element.

[Reverse Speed]

As shown in FIG. 4, the first brake B1 and the third clutch C3 are operated at the reverse speed REV.

In a state that the torque of the second power delivery shaft 24 is input to the fourth rotational element N4 by an operation of the third clutch C3, the third rotational element N3 is operated as the fixed element by the operation of the first brake B1 such that a reverse shift line SR is formed. Therefore, the reverse speed REV is output through the second rotational element N2 which is the output element.

The torque increased during a shifting is output through the second output gear 26 and the torque of the first power delivery shaft 18 is output through the first output gear 20. The torque of the second output gear 26 and the torque of the first output gear 20 at the first power delivery shaft 18 are added at a transfer shaft 28 forming a node, and the final torque is output to the driving wheel through a differential apparatus (not shown).

As described above, the torque transmitted from the engine is divided into two portions by the planetary gear set PG of the torque split device 2, and a portion of the torque is transmitted to the sun gear S. The portion of the torque is transmitted to the transmission apparatus 6 through the torque converter T/C and is increased during the shifting occurring by the operations of the clutches C1, C2, and C3 and the brakes B1 and B2. After that, the portion of the torque is transmitted to the transfer shaft 28.

In addition, the other portion of the torque is transmitted through the first power delivery shaft 18 and is added to the portion of the torque transmitted from the transmission apparatus 6.

At this time, the transfer shaft 28 receives the torques with different rotational speed respectively from the first and second output gears 20 and 26, but can add the torques transmitted through two paths by complementary operation of the torque split device 2 and the launching device 4 which are not compete rigid body.

A portion of torque divided by a torque split device is transmitted to the second power delivery path and is increased during passing through a launching device and a transmission device. Then, the portion of the torque is added to the other portion of torque transmitted through the first power delivery path, and a final torque is output.

At this time, the portion of the torque transmitted from the torque split device to the second power delivery path is smaller than the other portion of the torque transmitted to the first power delivery path, and is increased during passing through the launching device and the transmission device.

Since the torque applied to the launching device and the transmission device disposed on the second power delivery path is small, design capacity (diameter of a shaft, thickness of a case, size and the number of clutch) of the components used in the launching device and the transmission device may be smaller than that of the components used in a conventional transmission device. Accordingly, size of the transmission can be reduced.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque split type automatic transmission which transmits a torque output from an engine through two paths, adds each torque passing through and being increased in each path, and outputs a final torque,
   wherein the torque of the engine is divided into two portions by a torque split device and each portion of the torque is transmitted respectively to first and second power delivery paths of the two paths,
   wherein the first power delivery path is operably connected to a driving wheel via a transfer shaft,
   wherein the second power delivery path is provided with a launching device and a transmission device disposed in series so as to increase the torque passing through the second power delivery path, and output of the transmission device on the second power delivery path is directly added to the torque of the first power delivery path via the transfer shaft to output the final torque, and
   wherein the torque split device is not directly connected to the transmission device, and
   wherein the first power delivery path completely bypasses the launching device and the transmission device to the transfer shaft.

2. The torque split type automatic transmission of claim 1, wherein the torque split device comprises a single pinion planetary gear set such that one rotational element of three rotational elements is operated as an input element receiving the torque of the engine, and the other two rotational elements are operated as output elements by being connected respectively to the first and second power delivery paths.

3. The torque split type automatic transmission of claim 2, wherein the torque transmitted through the first power delivery path is larger than the torque transmitted through the second power delivery path.

4. The torque split type automatic transmission of claim 1, wherein the launching device disposed in the second power delivery path is a torque converter.

5. The torque split type automatic transmission of claim 1, wherein the transmission device disposed in the second power delivery path is a multiple-shift transmission device comprising a plurality of planetary gear sets, clutches, and brakes.

6. A torque split type automatic transmission which transmits a torque output from an engine through two paths, adds each torque passing through and increased in each path of the two paths, and outputs a final torque, the torque split type automatic transmission comprising:
   a torque split device comprising a planetary gear set which receives the torque of the engine, divides the torque into two portions, and transmits the two portions of the torque respectively to first and second power delivery paths of the two paths;
   a first power delivery shaft engaged to the torque split device to form the first power delivery path and provided with a first output gear;
   a launching device being a torque converter, engaged to the torque split device, disposed in the second power delivery path, and converting the torque transmitted to the second power delivery path to output a first torque;
   a transmission device disposed downstream of the launching device in the second power delivery path to receive the first torque, performing multiple-shift, and provided with a second output gear to output a second torque; and
   a transfer shaft engaged respectively with the first and second output gears, directly adding the torque transmitted through the first power delivery path and the second torque of the transmission device, and finally outputting the final torque,
   wherein the torque split device is not directly connected to the transmission device, and
   wherein the first power delivery path completely bypasses the launching device and the transmission device to the transfer shaft.

7. The torque split type automatic transmission of claim 6, wherein the torque split device comprises a single pinion planetary gear set and is disposed in the torque converter which is the launching device.

8. The torque split type automatic transmission of claim 7, wherein the torque split device comprises a sun gear, a planet carrier, and a ring gear as rotational elements thereof, and
   wherein the planet carrier is directly connected to an output shaft of the engine so as to be operated as an input element, the ring gear is connected to the first power delivery shaft forming the first power delivery path, and the sun gear is connected to an impeller of the torque converter through a connecting member and is connected to a turbine through a lock-up clutch so as to form the second power delivery path.

9. The torque split type automatic transmission of claim 8, wherein the connecting member is selectively connected to a front cover of the torque converter directly connected to the output shaft of the engine by interposing a direct-coupling clutch.

10. The torque split type automatic transmission of claim 6, wherein the transmission device comprises first and second planetary gear sets being single pinion planetary gear sets, and wherein the first planetary gear set comprises a first sun gear, a first planet carrier, and a first ring gear as rotational elements thereof, and the second planetary gear set comprises a second sun gear, a second planet carrier, and a second ring gear as rotational elements thereof.

11. The torque split type automatic transmission of claim 10, wherein the first planet carrier is directly connected to the second ring gear and the first ring gear is directly connected to the second planet carrier such that the first sun gear is a first rotational element, the first planet carrier and the second ring gear are a second rotational element, the first ring gear and the second planet carrier are a third rotational element, and the second sun gear is a fourth rotational element, wherein the first rotational element is selectively connected to the second power delivery shaft connected to a turbine by interposing a first clutch, wherein the third rotational element is selectively connected to the second power delivery shaft by interposing a second clutch and is selectively connected to a transmission housing by interposing a first brake disposed in parallel with an one-way clutch, wherein the fourth rotational element is selectively connected to the second power delivery shaft by interposing a third clutch and is selectively connected to the transmission housing by interposing a second brake, and wherein the second rotational element is connected to the second output gear and is operated as an output element to output the second torque.

\* \* \* \* \*